(No Model.)

J. C. McCANDLESS & O. KING.
CULTIVATOR FOR LISTED CORN.

No. 330,143. Patented Nov. 10, 1885.

WITNESSES:
Chas. Nida
C. Sedgwick

INVENTOR:
J. C. McCandless
O. King
BY Munn & Co
ATTORNEYS.

UNITED STATES PATENT OFFICE.

JOHN C. McCANDLESS AND ORSON KING, OF RANDOLPH, KANSAS.

CULTIVATOR FOR LISTED CORN.

SPECIFICATION forming part of Letters Patent No. 330,143, dated November 10, 1885.

Application filed July 15, 1885. Serial No. 171,713. (No model.)

*To all whom it may concern:*

Be it known that we, JOHN C. McCANDLESS and ORSON KING, both of Randolph, in the county of Riley and State of Kansas, have invented certain new and useful Improvements in Cultivators for Listed Corn, of which the following is a full, clear, and exact description.

Reference is to be had to the accompanying drawings, forming part of this specification, in which similar letters of reference indicate corresponding parts in all the figures.

Figure 1:
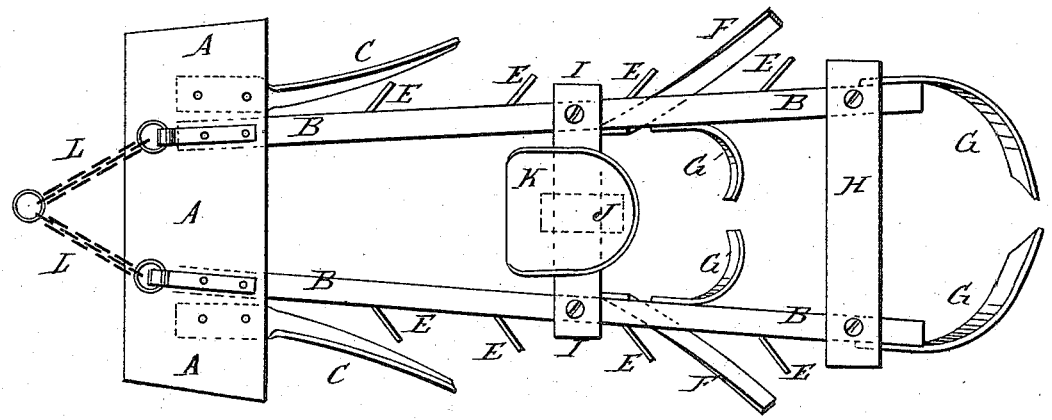
Figure 2:
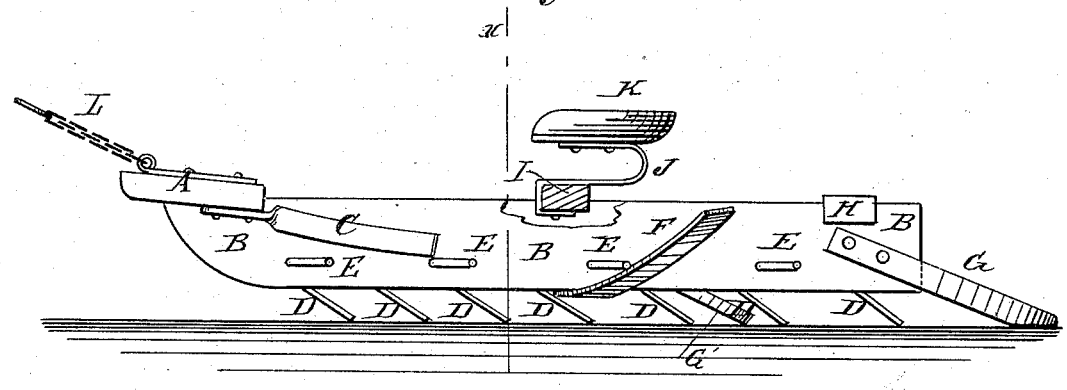
Figure 3:
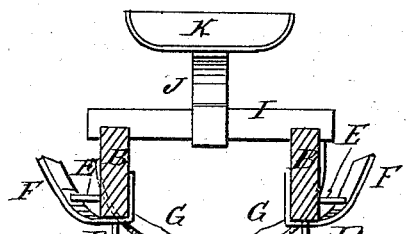

Figure 1 is a plan view of one of our improved cultivators. Fig. 2 is a side elevation of the same, part being broken away and the seat-bar being shown in section. Fig. 3 is a sectional front elevation of the same, taken through the line $x$ $x$, Fig. 2.

The object of this invention is to provide cultivators for cultivating listed corn, and which shall be so constructed as to loosen the soil and destroy the weeds and grass upon the tops and sides of the ridges and between the ridges.

The invention consists in the cultivator constructed in the manner hereinafter fully described and then claimed.

A represents a plank, about twenty inches wide and four and a half feet long, and which is designed to level and smooth the tops of the ridges, and to which the draft-chains L are attached. The lower side of the forward edge of the plank A is beveled or rounded to cause it to pass over the ground readily.

To the lower side of the plank A, upon the opposite sides of and equally distant from its center, and about seven inches apart, are bolted the upper edges of the forward ends of the runners B, which incline from each other slightly, so that their rear ends will be about twelve inches apart.

To the under side of the plank A, at the outer sides of the forward ends of the runners B, are attached two knives, C, about fourteen inches in length, and set at an angle of about thirty degrees, (30°,) to loosen the soil and cut the weeds on the tops of the ridges. To the lower edge of each runner B are attached seven (more or less) pins, D, about ten inches apart, and which project about three and a half inches, and incline to the rearward at an angle of about sixty degrees, (60°,) so as to destroy the weeds and loosen and pulverize the soil at the bottom of the furrow, the inclination of the pins D causing them to free themselves of rubbish.

To the lower part of the outer side of each runner B are attached four (more or less) pins, E, which project about three and a half inches, and are inclined to the rearward at an angle of about sixty degrees, (60°,) so as to loosen the soil and pulverize the lumps and baked ground at the sides of the ridges, the rearward inclination of the said pins causing them to free themselves of rubbish.

To the lower edges of the runners B, a little in the rear of their centers, are attached knives F, about fourteen inches in length, which incline to the rearward at an angle of about seventy-five degrees, (75°,) and are curved upward into such a position that they will destroy all weeds upon the sides of the ridges, will work about two inches beneath the surface of the soil, and will clear themselves of rubbish.

To the rear ends of the runners B are attached knives G, about fourteen inches long and four inches wide, and which are curved inward, and are set with a forward pitch, so as to run about three inches beneath the surface of the loose soil at the bottom of the furrow, destroy the weeds, and draw the said loose soil to and around the stems of the plants, the inner ends of the said knives being at such a distance apart as to pass along the opposite sides of the row of plants.

When cultivating corn the second time, a pair of curved knives, G', about fourteen inches long and two and a half inches wide, are attached to the inner sides of the runners B at a little distance from their rear ends. With this construction the knives G' destroy the weeds and throw soil around the stalks, while the knives G fill the furrows opened by the knives G'.

The runners B are connected and held at the proper distance apart by the cross-bar H, attached to the rear parts of their upper edges, and the cross-bar I, attached to the middle parts of the said edges.

To the center of the cross-bar I is attached the lower end of the spring-standard J, to the upper end of which is attached the driver's seat K, so that the driver's weight will hold the cultivator down to its work.

Having thus described our invention, what we claim as new, and desire to secure by Letters Patent, is—

A cultivator for listed corn, constructed substantially as herein shown and described, and consisting of the runners B, connected at their forward ends by a plank, A, for leveling the tops of the ridges, and provided at their lower edges with inclined pins D, to loosen the soil at the bottom of the furrow, at their sides with pins E, to loosen the soil at the sides of the ridges, the forward knives, C, for destroying the weeds at the tops of the ridges, the middle knives, F, for destroying the weeds at the sides of the ridges, and one or more pairs of knives G, for destroying the weeds at the bottom of the furrow and throwing soil around the stems of the plants, as set forth.

JOHN C. McCANDLESS.
ORSON KING.

Witnesses:
S. E. FOREMAN,
M. FOREMAN.